G. H. BOLUS.
TROLLEY WIRE HANGER FOR CATENARY SYSTEMS.
APPLICATION FILED JULY 3, 1916.

1,229,705.

Patented June 12, 1917.

Witnesses
Leo J. Madden
W. W. Hunzicker

Inventor
Glenn H. Bolus

By George A. Mead.
Attorney

UNITED STATES PATENT OFFICE.

GLENN HENRY BOLUS, OF MANSFIELD, OHIO, ASSIGNOR TO THE OHIO BRASS COMPANY, OF MANSFIELD, OHIO, A CORPORATION OF NEW JERSEY.

TROLLEY-WIRE HANGER FOR CATENARY SYSTEMS.

1,229,705.     Specification of Letters Patent.     Patented June 12, 1917.

Application filed July 3, 1916. Serial No. 107,348.

*To all whom it may concern:*

Be it known that I, GLENN H. BOLUS, a citizen of the United States, residing at Mansfield, in the county of Richland and State of Ohio, have invented certain new and useful Improvements in Trolley-Wire Hangers for Catenary Systems, of which the following is a specification.

My invention relates to improvements in the means for suspending trolley wires from cable supports.

The object of my invention is to provide a device which will suspend trolley wires from a flexible overhead support and either engage the support freely or engage the support tightly against movement; and to provide means to prevent the device from disengaging the support should its grip on the support loosen.

My improved construction as shown by the drawings, consists of a connecting rod upon the ends of which are means for attachment to a messenger cable and to a trolley wire. The means at the lower end is a clamp for attachment to a trolley wire which will securely grip the same and may be of any of the well known forms on the market or of any other suitable design. The means at the upper end of the connecting rod for attachment to a supporting or messenger cable is a yoke of such a construction that the arrangement between the yoke and connecting rod can be adjusted for first receiving the messenger cable within the yoke, and then securely gripping the cable between the two parts for holding the hanger in its installed position on the messenger cable or loosely engaging the yoke member on the messenger cable if so desired. If the device grips the cable tightly and the hold upon the cable should give way, the hanger can not slip from the cable but is engaged loosely by the yoke. This result is secured by the novel shape and arrangement of parts.

In Figure 1 is shown an elevation view of my device when installed.

Figure 4:
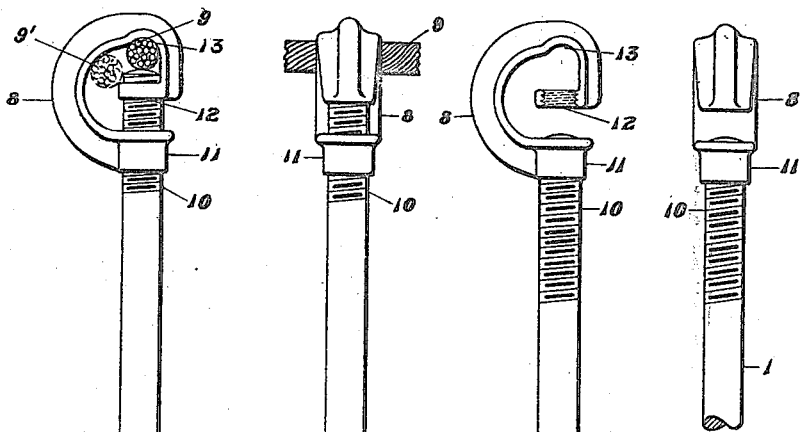
Fig. 4 shows an elevation view of my device taken at right angles to Fig. 3.

My invention consists of a rod or connecting member 1 which may be of various shapes and forms to accommodate requirements; in the drawings it is shown as a rod screw threaded at both ends. On the lower end is attached a clamp for gripping the trolley wire and may be of any design whatsoever which will properly grip the trolley; in the drawing is shown a 2 part trolley clamp of well known form consisting of a body 2 and a clamping member 3 and screw 4 for drawing the clamp parts into engagement with the trolley wire 5. A boss 6 provided with a screw threaded cavity is a part of the clamp body and is attached to the lower end of the rod 1.

The upper end of the rod 1 is provided with screw threads 10 and a yoke member 8 is mounted thereon for attaching the hanger to the messenger either loosely or tightly.

The ends of the yoke are provided with screw threaded bosses 11 and 12 which have their axes coincident and one boss 12 being incurved thereby providing a space between it and the boss 11 and the side of the yoke. Opposite the threaded opening of the boss 12 in the face of the yoke is a depression 13 for receiving the messenger 9 when it is desired to grip the messenger tightly to prevent the movement of the hanger on the messenger cable. A modification is to make the boss 12 with an unthreaded opening and sufficiently large to receive the end of the rod 1. (See Fig. 5.)

Numeral 9' shows the position of the messenger cable 9 as it would appear if it should slip out of its position shown by numeral 9 or if the hanger should be installed loosely on the messenger.

Figures 1, 2, 3, 5:
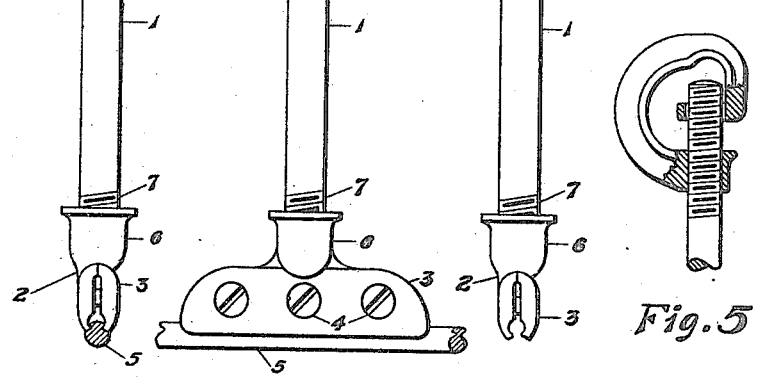
Fig. 2 shows an elevation view taken at right angles to Fig. 1.
Fig. 3 shows an elevation view of my device not assembled upon either the trolley or messenger but with the parts in position to receive both.
Fig. 5 shows an elevation view in partial section of the yoke member showing one boss only of the yoke member to be threaded.

To install my device, I first open up the space between bosses 11 and 12 by unscrewing the rod 1 which leaves the space between bosses 11 and 12 open as shown by Figs. 3 and 4, for the reception of the messenger cable.

The hanger yoke 8 with rod and clamp assembled as shown in Figs. 3 and 4 is now hooked upon the messenger cable: if it is desired to grip the cable tightly, the cable is placed in the recess 13 and the rod run up into tight engagement with the cable and until the trolley clamp at the lower end of the rod 1 is tight upon the rod 1 and in alinement with the trolley wire. The trolley wire is now placed between the jaws of the clamp and the clamp tightened upon the wire. It will be readily seen that when the two ends of the rod are threaded in the same direction and the hanger installed as shown by Figs. 1 and 2, then it will be impossible for the parts to separate so long as the trolley clamp remains in position on the trolley wire.

If it is desired to install the hanger loosely upon the messenger cable, the same procedure is to be gone through as described above except the cable is positioned as shown by 9" Fig. 1 and the upper end of the rod 1 is run up into contact with the face of the recess 13.

Many changes will be obvious to one skilled in the art and which my invention as shown and described is subject to without departing from the spirit and scope of my invention and therefore, I do not wish to be limited to the exact disclosure herein made.

Having thus described my invention, what I claim is:—

1. In a trolley hanger the combination of a yoke member for attaching to a suspension cable, a trolley wire clamp and a connecting rod uniting the yoke and clamp and engaging the suspension cable; the yoke member consisting of a U shaped body, both ends of which are provided with openings therethrough whose axes coincide, and one of the openings being screw threaded.

2. In a trolley hanger the combination of a yoke member for attaching to a suspension cable, a trolley wire clamp and a connecting rod uniting the yoke and clamp and engaging the suspension cable; the yoke member consisting of a U shaped body, both ends of which are provided with screw threaded openings therethrough whose axes coincide.

3. In a trolley wire hanger the combination of a yoke member for attaching to a suspension cable, a trolley wire clamp and a connecting rod attached to the yoke and clamp; the yoke member consisting of a U shaped body, both ends of which are provided with openings therethrough to receive one end of the connecting rod, one end of the yoke member being incurved and the other end having its opening screw threaded.

4. In a trolley wire hanger the combination of a yoke member for attaching to a suspension cable, a trolley wire clamp and a connecting rod attached to the yoke and clamp; the yoke member consisting of a U shaped body, both ends of which are provided with openings therethrough to receive one end of the connecting rod, one end of the yoke member being incurved.

5. In a trolley wire hanger the combination of a yoke member for attaching to a suspension cable, a trolley wire clamp and a connecting rod attached to the yoke and clamp and adapted to engage the suspension cable; the yoke member consisting of a U shaped body, both ends of which are provided with openings therethrough to receive one end of the connecting rod.

6. In a trolley wire hanger the combination of a yoke member for attaching to a suspension cable, a trolley wire clamp and a connecting rod to the ends of which the yoke and clamp are attached; the yoke member consisting of a U shaped body, each end of which is provided with means for attachment to one end of the connecting member, one end of the yoke member being incurved and arranged to allow passing the yoke member over a suspension cable.

7. In a trolley wire hanger the combination of a yoke member for attaching to a suspension cable, a trolley wire clamp and a connecting rod to the ends of which the yoke and clamp are attached; the yoke member consisting of a U shaped body, one end of which is provided with means for attaching to one end of the connecting rod, the other end of the yoke member being incurved and arranged to allow passing the yoke member over a suspension cable.

8. In a trolley wire hanger the combination of a yoke member for attachment to a suspension cable, a trolley wire clamp and a connecting rod to the ends of which the yoke and clamp are attached; the yoke member consisting of a U shaped body, one end being arranged for adjustable attachment to the connecting rod, the other end provided with means for receiving the connecting rod and being incurved to provide a space between the two ends to allow passing the yoke member over a suspension cable, and also allow space between the incurved member and the face of the yoke body opposite for receiving the suspension cable.

9. In a trolley wire hanger the combination of a yoke member for attachment to a suspension cable, a trolley wire clamp and a connecting member to the ends of which the yoke and clamp are attached; the yoke member consisting of a U shaped body, each end of which is provided with means for attaching to one end of the connecting rod, one end of the yoke being incurved.

10. In a trolley wire hanger the combination with a suspension cable of a yoke member having a U shaped body for removably engaging over a cable, the yoke member having a threaded aperture at one end, a connecting rod threaded through the aperture and passing through an aperture in the other end of the yoke member and being adapted to be adjusted into engagement with the cable beyond the last named end to coöperate with the inner face of the yoke body to clamp the cable and also adapted to be adjusted away from the cable so that its extremity will stand in substantially the same horizontal plane as the last mentioned end of the yoke body to permit the cable to have free movement within the U shaped body and at the same time preventing displacement from the cable, and a trolley clamp attached to the free end of the connecting rod.

11. A trolley wire hanger adapted for attachment to a suspension cable comprising a yoke member, a trolley wire clamp and a connecting member, one end of the connecting member being adjustably attached to one end of the yoke and being in engagement with the other end of the yoke to close the space between the end of the yoke member for retaining the hanger on the cable.

12. The combination with a suspension cable of a trolley hanger comprising a yoke member, a trolley wire clamp and a connecting member to the ends of which the yoke and clamp are attached; the yoke member consisting of a U-shaped body, each end of which has means for engaging one end of the connecting member, one end of the yoke member being incurved, the inner face of the yoke body being provided with a depression, the suspension cable resting in the depression and being engaged by the end of the connecting member.

13. The combination with a suspension cable of a trolley hanger comprising a yoke member, a trolley wire clamp and a connecting member to the ends of which the yoke and clamp are attached; the yoke member consisting of a U-shaped body, the two ends of which are attached to one end of the connecting member and a suspension cable located within the closed loop formed by the yoke body and the connecting member.

14. A trolley wire hanger comprising a yoke member for engaging the suspension cable, a trolley wire clamp and a connecting member, the two ends of the yoke member being screw threaded and connected to one end of the connecting member.

15. A trolley wire hanger adapted for attachment to a suspension cable comprising a yoke member, a trolley wire clamp and a connecting member, one end of the connecting member arranged to close the space between the ends of the yoke member for retaining the hanger on the suspension cable by passing through openings in both ends of the yoke member and engage the suspension cable.

16. A trolley wire hanger adapted for attachment to a suspension cable comprising a yoke member, a trolley wire clamp and a connecting member, one end of which is screw threaded and arranged to engage with screw threaded openings in each end of the yoke to close the space between the ends of the yoke member for retaining the hanger on the cable.

17. In a messenger wire clamp the combination of a yoke member and a clamping member to engage the messenger wire; the yoke member consisting of a U shaped body, the extreme ends of which are provided with openings adapted to encircle one end of the clamping member to form a closed loop for a messenger wire.

18. In a messenger wire clamp the combination of a yoke member and a clamping member to engage the messenger wire; the yoke member consisting of a U shaped body, the extreme ends of which are provided with openings for receiving the clamping member to form a closed loop for a messenger wire.

19. In a messenger wire clamp the combination of a yoke member and a clamping member provided with means for attaching to the yoke member; the yoke member comprising a U shaped body, both ends of which are provided with means for receiving the end of the clamping member and a depression in the body in line with the clamping member.

20. In a messsenger wire clamp the combination of a yoke member and a clamping member provided with means for attaching to the yoke member; the yoke member comprising a U shaped body, both ends of which are provided with means for receiving the end of the clamping member and means on the body in line with the clamping member for receiving the messenger wire.

21. In a trolley wire hanger, the combination of a yoke member for attaching to a suspension cable, a trolley wire clamp and a connecting rod uniting the yoke and clamp; the yoke member consisting of a U shaped body, both ends of which are provided with openings therethrough whose axes coincide, and one of the openings being screw threaded, the combination of the yoke and connecting rod forming a closed loop for maintaining the suspension cable in loose engagement with the yoke member.

22. In a trolley wire hanger, the combination of a yoke member for attaching to a suspension cable, a trolley wire clamp and a connecting rod attached to the yoke and clamp; the yoke member consisting of a U shaped body, the extreme ends of which are provided with openings therethrough to receive one end of the connecting rod to form a closed loop for a suspension cable and directly grip the suspension cable.

In testimony whereof I affix my signature in the presence of two witnesses.

GLENN HENRY BOLUS.

Witnesses:
C. P. MARKS,
G. L. BUCHAN.

Copies of this patent may be obtained for five cents each, by addressing the "Commissioner of Patents, Washington, D. C."